US008442430B2

(12) United States Patent
Hwang et al.

(10) Patent No.: US 8,442,430 B2
(45) Date of Patent: May 14, 2013

(54) APPARATUS AND METHOD FOR PROCESSING SIGNALS IN A DISTRIBUTED ANTENNA SYSTEM

(75) Inventors: Seong-Taek Hwang, Pyeongtaek-si (KR); Won-Jin Sung, Seoul (KR); Jae-Won Kim, Seoul (KR); Eui-Seok Song, Seoul (KR)

(73) Assignees: Samsung Electronics Co., Ltd (KR); Industry-University Cooperation Foundation Sogang University (KR)

( * ) Notice: Subject to any disclaimer, the term of this patent is extended or adjusted under 35 U.S.C. 154(b) by 727 days.

(21) Appl. No.: 12/412,100

(22) Filed: Mar. 26, 2009

(65) Prior Publication Data
US 2009/0247200 A1 Oct. 1, 2009

(30) Foreign Application Priority Data
Mar. 26, 2008 (KR) ........................ 10-2008-0027919

(51) Int. Cl.
*H04Q 7/20* (2006.01)

(52) U.S. Cl.
USPC ............................................. 455/7; 455/11.1

(58) Field of Classification Search .................. 455/7, 9, 455/10, 11.1, 13.1, 15, 16, 67.11, 445
See application file for complete search history.

(56) References Cited

U.S. PATENT DOCUMENTS

| | | | |
|---|---|---|---|
| 7,386,274 B2 * | 6/2008 | Weigand | 455/11.1 |
| 7,734,250 B2 * | 6/2010 | Sommer | 455/11.1 |
| 7,773,941 B2 * | 8/2010 | Bonta et al. | 455/11.1 |
| 7,920,826 B2 * | 4/2011 | Kim et al. | 455/16 |
| 8,000,648 B2 * | 8/2011 | Yoshida et al. | 455/7 |
| 8,000,650 B2 * | 8/2011 | Chang et al. | 455/11.1 |
| 8,032,146 B2 * | 10/2011 | Zhu et al. | 455/450 |
| 8,040,826 B2 * | 10/2011 | Lee et al. | 370/293 |
| 2004/0102157 A1 | 5/2004 | Lewis | |
| 2008/0165719 A1 * | 7/2008 | Visotsky | 370/315 |
| 2008/0232296 A1 * | 9/2008 | Shin et al. | 370/315 |

FOREIGN PATENT DOCUMENTS

| | | |
|---|---|---|
| EP | 1 777 837 | 4/2007 |
| WO | WO 2006/088400 | 8/2006 |
| WO | WO 2008/003022 | 1/2008 |
| WO | WO 2008/011320 | 1/2008 |

OTHER PUBLICATIONS

Hammerstrom et al., "Impact of Relay Gain Allocation on the Performance of Cooperative Diversity Networks", 2004.

* cited by examiner

*Primary Examiner* — Henry Choe
(74) *Attorney, Agent, or Firm* — The Farrell Law Firm, P.C.

(57) ABSTRACT

An apparatus and method for processing signals in a distributed antenna system. The method includes receiving, by a Base Station (BS), Channel State Information (CSI) from Mobile Stations (MSs) located within a coverage area of the BS or a coverage of Relay Stations (RSs) connected to the BS; multiplying signals for transmission to the MSs by beamforming vectors by using the CSI; and transmitting the multiplied signals to the MSs.

12 Claims, 7 Drawing Sheets

APPARATUS AND METHOD FOR PROCESSING SIGNALS IN A DISTRIBUTED ANTENNA SYSTEM

PRIORITY

This application claims priority to applications entitled "Apparatus and Method for Processing Signals in Distributed Antenna System" filed in the Korean Industrial Property Office on Mar. 26, 2008 and assigned Serial No. 10-2008-0027919, the content of which are incorporated herein by reference.

BACKGROUND OF THE INVENTION

1. Field of the Invention

The present invention relates generally to technology for increasing the transmission capacity of a Mobile Station (MS) in a distributed antenna system using multiple distributed antennas that are connected to a Base Station (BS) by wire or a dedicated line, and more particularly to an apparatus and method for simultaneously transmitting signals to multiple MSs by using a Maximal Ratio Transmission (MRT) scheme.

2. Description of the Related Art

With the growth of the information industry, there is an increasing need for technologies that enable various types of mass data to be transmitted at high speed. As a result, research is actively being conducted on a multi-hop scheme that is designed in an attempt to reduce shadow areas and extend coverage by disposing multiple distributed antennas in existing cells.

A multi-hop scheme is basically divided into a scheme in which a BS and Relay Stations (RSs) are wirelessly interconnected, and a scheme in which a BS and RSs are connected by wires. In the wireless multi-hop scheme, transmission power is reduced because multiple wireless RSs partially sharing wireless resources with a BS reduce a transmission range as compared to a conventional cellular system only including a BS. Also, path loss is reduced due to shortened transmission distances between the RSs and the MSs, which enables high-speed data transmission and increases the transmission capacity of a cellular system.

However, because transmission for data relay is additionally required as compared to a single-hop scheme, and many RSs share the limited resources of the system, deterioration of service quality is often caused. That is, while the multi-hop scheme using wireless RSs may improve the Signal-to-Interference plus Noise Ratio (SINR) of an MS in the cell edge area, it also has difficulty in largely extending system capacity because frame resources are partially used for relay transmission, and thus effective channel resources available to the MS are then reduced.

The wired multi-hop scheme, in which a cell is configured by linking a BS and each RS by an optical cable, has a basic network configuration that is similar to that of the multi-hop scheme using wireless RSs, but is different therefrom in that the link between the BS and each RS is a wired link, and fixed RSs are used.

In comparison to the wireless multi-hop scheme, the wired multi-hop scheme is less cost efficient because optical cables must be installed, and is less convenient as the RSs are difficult to move after installation. However, the wired multi-hop scheme is advantageous over the wireless multi-hop scheme in that there is no signal loss between a BS and each RS, and interference is reduced. Also, by transmitting various types of control signals over a wired link between a BS and each RS, it is possible to apply high-complex and high-efficient resource allocation techniques and collaborative signal transmission schemes between the RSs.

Mobile cellular systems that currently operate in the wired multi-hop scheme provide services to multiple MSs in a cell by using Multiple Access (MA) schemes, such as Code Division Multiple Access (CDMA), Time Division Multiple Access (TDMA), and Frequency Division Multiple Access (FDMA). However, because the MA schemes divide and use a limited amount of available resources, such as codes, time, and frequencies, they do not often satisfy the demands for high-speed transmission of mass multimedia information to more users with the growth of mobile communication technology.

As a solution to this problem, research is actively conducted on a scheme for simultaneously transmitting signals to multiple MSs by using Multiple-Input Multiple-Output (MIMO) technology in which signals are transmitted through multiple antennas disposed at transmitting and receiving ends. Examples of such schemes using MIMO technology include a Dirty Paper Coding (DPC) scheme and a beamforming scheme.

The DPC scheme, which is essentially an interference signal pre-cancellation technique, is a scheme in which an interference signal known to a transmitting end is pre-cancelled at the transmitting end, such that the transmitting end is not affected by the interference signal. Although the DPC scheme is considered a scheme that provides the most optimal performance from among currently known schemes, it is difficult to actually apply because the complexity of encoding and decoding increases as the number of MSs included in the system increases.

In the beamforming scheme, which is smart antenna schemes, a beam of a transmit/receive antenna is limited to a corresponding MS. When signals are transmitted using this scheme, the resulting increase in transmission capacity is lower than that of the DPC scheme, but implementation complexity also comparatively reduced. Accordingly, the beamforming scheme is often referred to as a quasi-optimal technique.

Additionally, the beamforming scheme may simultaneously transmit signals to multiple MSs by multiplying signals for respective MSs by beamforming vectors independent of each other and transmitting the resultant signals. However, there is a problem in that when the beamforming scheme is applied, there may be interference between MSs receiving the signals, depending on channel characteristics in the actual environment, which results in performance deterioration. Therefore, there is still a need to minimize interference between MS signals, while increasing the overall transmission capacity of a cell in a distributed antenna system.

SUMMARY OF THE INVENTION

Accordingly, the present invention has been designed to solve at least the above-mentioned problems occurring in the prior art, and provide at least advantages described below. That is, the present invention provides an apparatus and method for increasing an overall transmission capacity of a cell by multiplying signals for multiple MSs located within the cell by beamforming vectors that are independent of each other.

In accordance with an aspect of the present invention, there is provided a method of processing signals in a distributed antenna system. The method includes receiving, by a Base Station (BS), Channel State Information (CSI) from Mobile Stations (MSs) located in a coverage area of the BS or a coverage area of Relay Stations (RSs) connected to the BS; multiplying signals for transmission to the MSs by beamforming vectors by using the CSI; and transmitting the signals for transmission multiplied by the beamforming vectors to the MSs.

In accordance with another aspect of the present invention, there is provided an apparatus for processing signals in a distributed antenna system. The apparatus includes Mobile Stations (MSs); a Base Station (BS) for multiplying signals for transmission to the MSs located in a cell coverage area of the BS by independent beamforming vectors, and transmitting the multiplied signals for transmission to the MSs; and Relay Stations (RSs) for transmitting the multiplied signals, transmitted from the BS, to the MSs.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
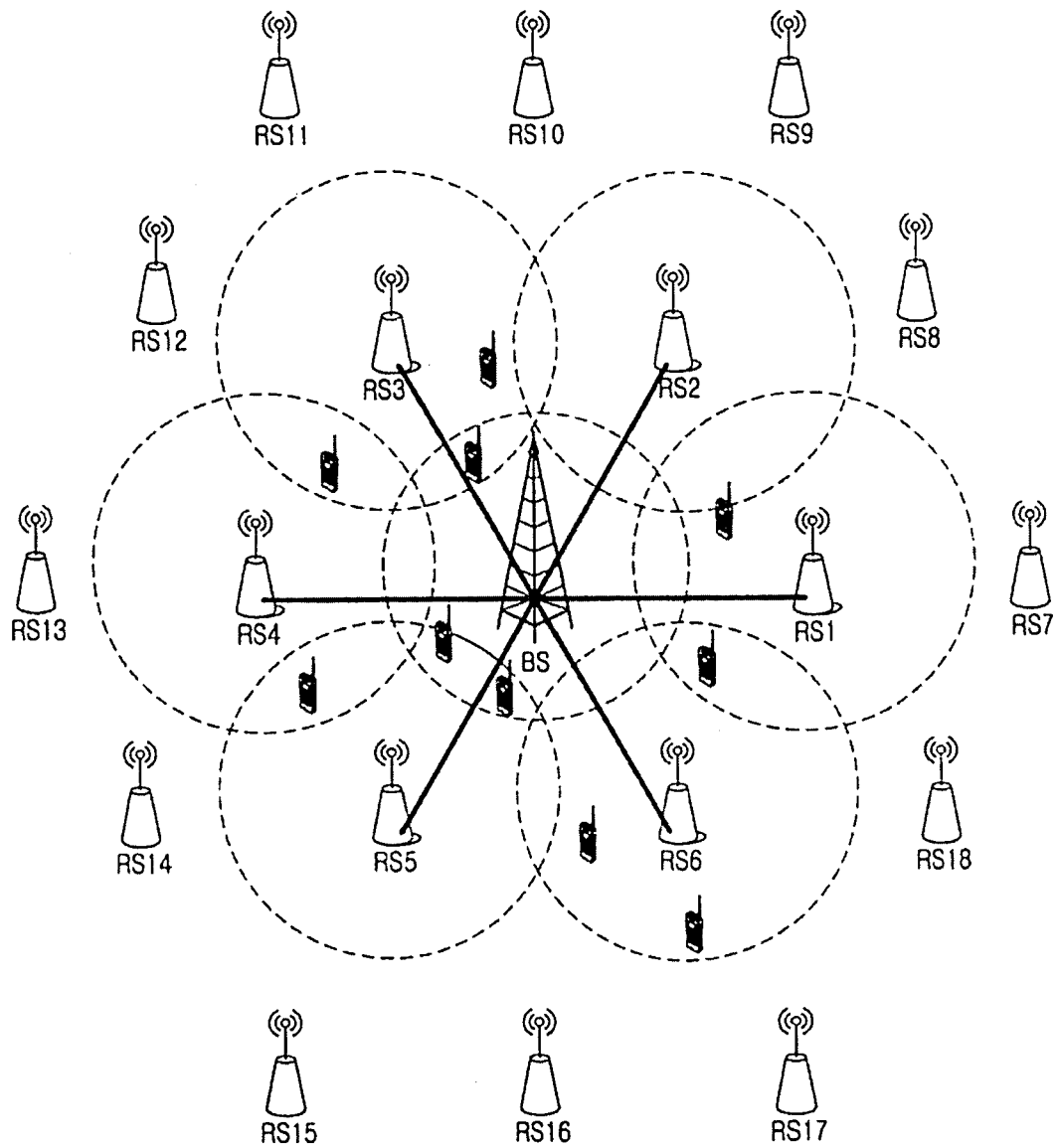
FIG. 1 schematically illustrates a structure of a cellular system using wired RSs.

Hereinafter, embodiments of the present invention will be described with reference to the accompanying drawings. It should be noted that the similar components are designated by similar reference numerals although they are illustrated in different drawings. Also, in the following description, it should be noted that only parts essential for understanding the operations according to the present invention will be described and a detailed description of known functions and configurations incorporated herein will be omitted when it may obscure the subject matter of the present invention.

In a distributed antenna system in accordance with an embodiment of the present invention, a centralized cellular system is assumed as a basic model. Herein, the centralized cellular system refers to a cellular system in which all algorithms for communication between a BS and MSs, or between RSs and MSs, are performed only by the BS, and the RSs only perform transmission/reception. Therefore, control information for all signals is collected to the BS. Based on the control information, the BS allocates wireless resources to the respective MSs. Also, the present invention assumes a system having a frequency reuse factor of 1, in which all RSs use the same frequency band.

FIG. 1 schematically illustrates a structure of a cellular system using RSs. More specially, FIG. 1 illustrates a structure of a wired RS system including six RSs.

Referring to FIG. 1, a cell includes, for example, one BS and six RSs (RS1 to RS6), and each RS covers a corresponding sub-cell area. In such a system, an MS located near the BS is provided with services directly from the BS, and an MS located at the cell boundary and thus having a relatively low SINR of a received signal is preferably provided with services from a nearest RS.

This system illustrated in FIG. 1 has a cell split effect in which one cell is split into multiple cells due to multiple RSs, and each circular area around each RS indicates a coverage area including a minimum SINR level transmittable when each RS independently transmits a signal. An overlapping area between the coverage of one RS and the coverage of another RS is an area having strong signal interference, and usually indicates a cell boundary area with a relatively poor channel state. Strong signal interference also occurs when a signal is transmitted to an MS located in an area having many surrounding obstacles.

In accordance with an embodiment of the present invention, a signal transmission scheme is proposed, in which signals are simultaneously transmitted to M MSs selected from among N MSs located in coverage by using L RSs distributed in a cell. More specifically, herein below a procedure of simultaneously transmitting signals by using beamforming vectors will be first described, and then a procedure of minimizing inter-signal interference due to simultaneously transmitted signals will be described.

Figure 2:
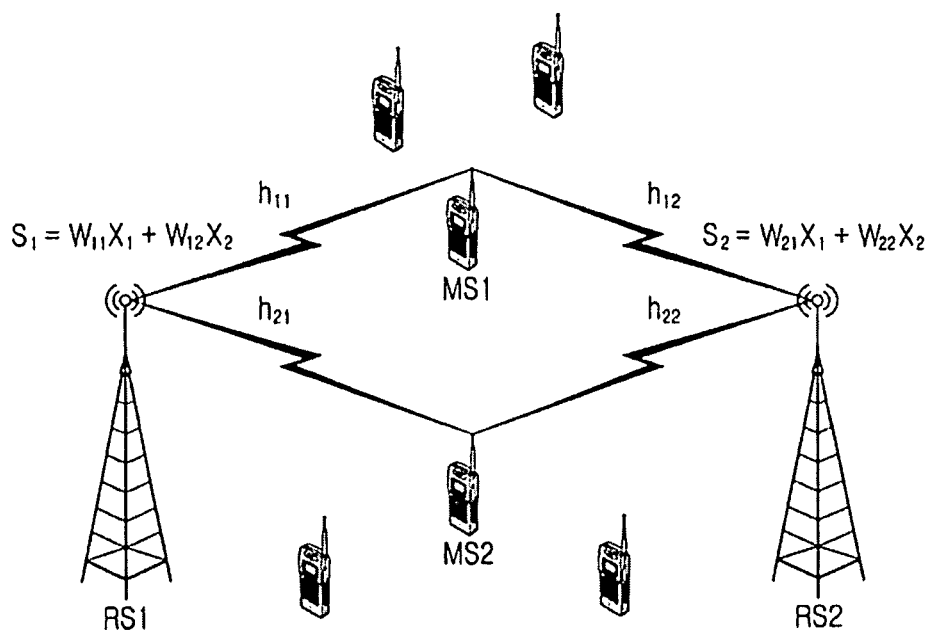
FIG. 2 illustrates signal transmission using beamforming vectors in accordance with an embodiment of the present invention.

FIG. 2 illustrates signal transmission using beamforming vectors according to an embodiment of the present invention. More specifically, FIG. 2 illustrates simultaneously transmitting signals to two MSs by using two RSs, by way of example. It is noted that the number of RSs and the number of MSs may vary according to the location and number of MSs included in coverage.

In order to simultaneously transmit signals to M MSs, a BS multiplies signals for transmission to the respective MSs by different beamforming vectors to obtain transmission signals to be simultaneously transmitted, as shown in Equation (1).

$$s = K_N W x \quad (1)$$

$$\begin{bmatrix} s_1 \\ s_2 \\ \vdots \\ s_L \end{bmatrix} = K_N \begin{bmatrix} w_{11} & w_{12} & \cdots & w_{1M} \\ w_{21} & \ddots & & \vdots \\ \vdots & & \ddots & \vdots \\ w_{L1} & \cdots & \cdots & w_{LM} \end{bmatrix} \begin{bmatrix} x_1 \\ x_2 \\ \vdots \\ x_M \end{bmatrix}$$

In Equation (1), s denotes transmission signals to be simultaneously transmitted through the respective RSs, and for example, $s_1$ denotes a signal to be transmitted by an lth RS. W denotes a beamforming matrix, each row of which corresponds to a weight vector of a signal to be transmitted by each RS, and each column corresponds to a weight vector of a symbol to be transmitted to each MS. Hereinafter, an mth column vector of matrix W will be defined by $w_m=[w_{1m}, w_{2m}, \ldots, w_{Lm}]^T$. Also, x denotes a symbol vector to be transmitted to the MSs, and is represented by $x=[x_1, x_2, \ldots, x_M]^T$. That is, $x_m$ denotes a symbol to be transmitted to an mth MS.

$K_N$ denotes a variable for normalizing a sum of transmission power of the RSs by L, and is defined by Equation (2).

$$K_N = \frac{L}{\|W\|} \quad (2)$$

Using $K_N$ as defined in Equation (2), signals to be received by the BS are defined as shown in Equation (3).

$$r = K_N H W x \quad (3)$$

$$\begin{bmatrix} r_1 \\ r_2 \\ \vdots \\ r_M \end{bmatrix} = K_N \begin{bmatrix} h_{11} & h_{12} & \cdots & h_{1L} \\ h_{21} & \ddots & & \vdots \\ \vdots & & \ddots & \vdots \\ h_{M1} & \cdots & \cdots & h_{ML} \end{bmatrix} \begin{bmatrix} w_{11} & w_{12} & \cdots & w_{1M} \\ w_{21} & \ddots & & \vdots \\ \vdots & & \ddots & \vdots \\ w_{L1} & \cdots & \cdots & w_{LM} \end{bmatrix} \begin{bmatrix} x_1 \\ x_2 \\ \vdots \\ x_M \end{bmatrix}$$

In Equation (3), H denotes a matrix representing channel responses between the BS or the RSs and the MSs. That is, $h_{ml}$ denotes a channel response between the BS or an lth RS and an mth MS, and an mth row vector of matrix H is defined by $h_m = [h_{m1}, h_{m2}, \ldots, h_{mL}]$.

In order to obtain the overall transmission capacity of signals to be transmitted to the BS when the signals are simultaneously transmitted using the equations above, reception SINRs are obtained using Equation (4).

$$\Gamma_m = \frac{|h_m w_m|^2}{\sum_{\substack{m'=1 \\ m' \neq m}}^{M} |h_{m'} w_{m'}|^2 + K_N^2 \sigma^2} \quad (4)$$

In Equation (4), m denotes an mth MS, and $\sigma^2$ denotes a sum of the average power of external interference signals and the average power of noise. Using the reception SINRs of the respective MSs, the overall transmission capacity of signals to be transmitted from L RSs to M MSs can be obtained from Equation (5).

$$C = \sum_{m=1}^{M} \log(1 + \Gamma_m) \quad (5)$$

As described above, the overall transmission capacity for MSs located within a coverage area can be obtained using Equations (4) and (5).

The overall transmission capacity obtained by Equation (5) includes inter-signal interference caused by simultaneous transmission of M signals, which may result in a loss in transmission capacity. In order to increase transmission capacity by minimizing such inter-signal interference caused when signals are simultaneously transmitted, an embodiment of the present invention proposes a method for selecting optimal MSs. Basically, the method of selecting optimal MSs may be divided into two types: (1) a method of generating beamforming vectors and selecting optimal MSs in consideration of all possible MS combinations, and (2) a method of generating orthogonal beamforming vectors and transmitting signals by using the generated orthogonal beamforming vectors.

In accordance with an embodiment of the present invention, multi-user diversity is used to minimize inter-signal interference. The multi-user diversity minimizes an interference problem due to channel characteristics when signals are transmitted using the beamforming scheme. According to the multi-user diversity, information on the channel characteristic experienced by each of the MSs is detected, and a signal is transmitted to an MS with the best channel characteristic.

When the multi-user diversity is used, MSs with channel characteristics orthogonal to each other can be selected, resulting in maximized gains when signals are transmitted to multiple MSs by using beamforming vectors. Herein below, reference will first be made to a method of generating beamforming vectors and selecting optimal MSs in consideration of all possible MS combinations.

I. Method of Generating Beamforming Vectors and Selecting Optimal MSs in Consideration of all Possible MS Combinations In this method, a possible $Q = {}_N C_M = N!/(N-M)!M!$) MS combinations are all considered in order to simultaneously transmit signals to M MSs to which signals can be simultaneously transmitted from among N MSs in a cell. Assuming that an MS combination maximizing transmission capacity obtainable by Equation (5) is $A_{max}$, $A_{max}$ can be obtained using Equation (6).

$$A_{max} = \underset{A_q}{\mathrm{argmax}} \left\{ \sum_{m \in A_q} \log_2(1 + \Gamma_m) \right\} \quad (6)$$

In Equation (6), it is assumed that $\{A_1, A_2, \ldots, A_Q\}$ is a set of MS combinations that must be considered. $A_q$ is defined as a qth MS combination including M MS indexes. Accordingly, using channel information for MSs constituting $A_{max}$, beamforming vectors $w_m$ can be generated from Equation (7).

$$w_m = h_m^H, \text{ where } m \in A_{max} \quad (7)$$

A procedure of selecting optimal MSs by using $A_{max}$ obtainable by Equation (6) and beamforming vectors generated by Equation (7) is performed according to an algorithm as will be described in conjunction with FIG. 3.

Figure 3:
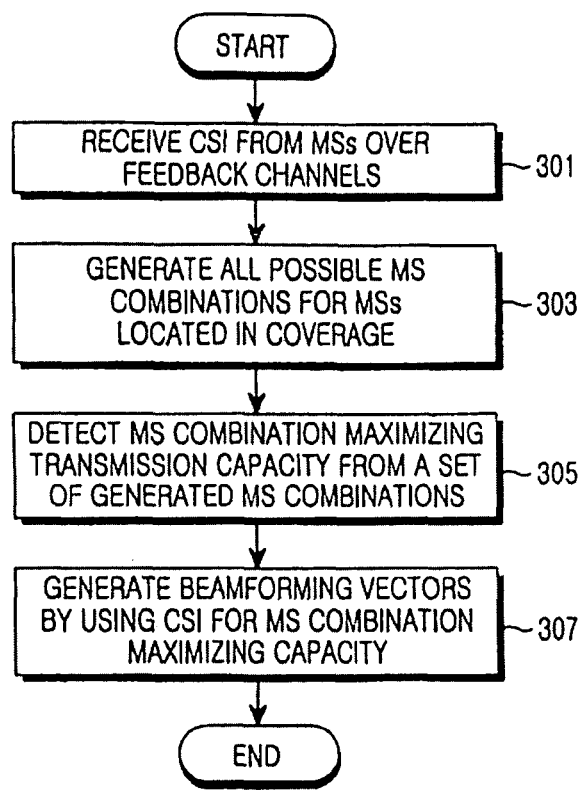
FIG. 3 is a flowchart illustrating a procedure of selecting optimal MSs in consideration of all possible MS combinations in accordance with an embodiment of the present invention.

FIG. 3 illustrates a procedure of selecting optimal MSs in consideration of all possible MS combinations according to an embodiment of the present invention.

Referring to FIG. 3, in step 301, a BS receives respective Channel State Information (CSI) from each of the MSs. Each CSI includes $\sigma^2$ denoting a sum of the average power of external interference signals and the average power of noise, and a column vector of beamforming matrix H.

In step 303, the BS generates possible MS combinations by using the CSI for all the MSs located in coverage. These MS combinations may be a single MS combination or a plurality of MS combinations according to the number of the MSs.

In step 305, the BS uses Equation (6) to obtain an MS combination that maximizes transmission capacity from among the generated MS combinations.

Thereafter, in step 307, the BS generates beamforming vectors $w_m$ by using CSI for the MS combination maximizing transmission capacity.

Figure 4:
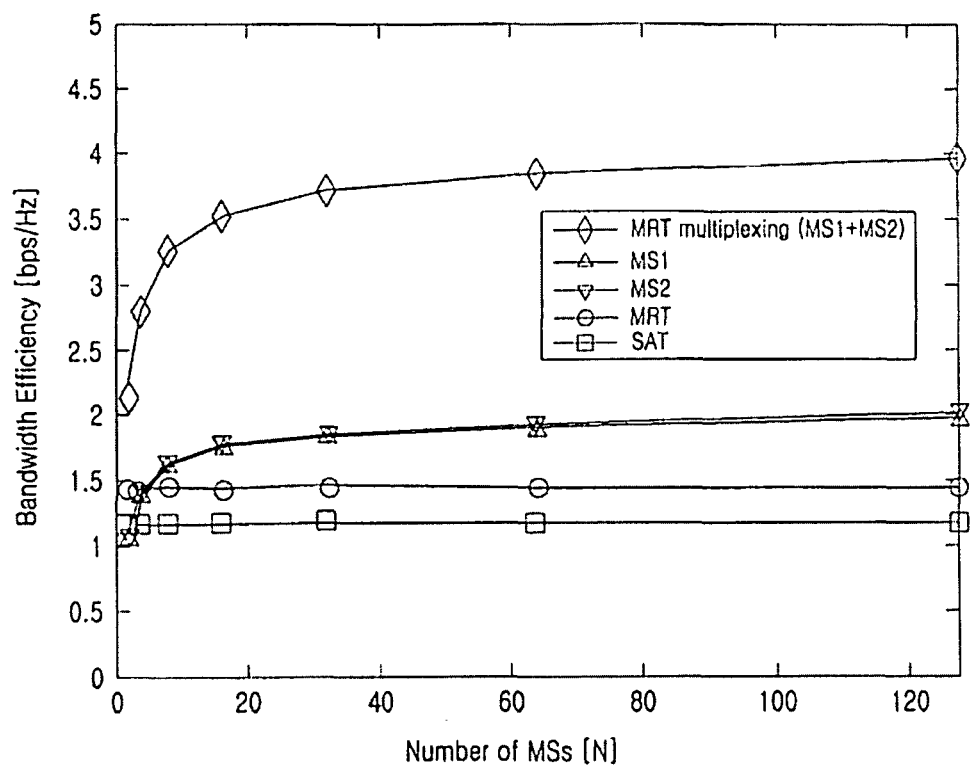
FIG. 4 is a graph illustrating bandwidth efficiency analysis results according to a number of MSs, when considering all possible MS combinations in accordance with an embodiment of the present invention.

FIG. 4 illustrates bandwidth efficiency analysis results when considering all possible MS combinations according to an embodiment of the present invention. More specifically, in FIG. 4, the X-axis represents a total number of MSs located within the system, and the Y-axis represents a transmission capacity for an MS combination that maximizes capacity.

Referring to FIG. 4, variations of channel capacity according to an increase in a total number of MSs being located in a cell, N, are plotted under the Rayleigh fading channel environment, where a channel response between each RS and each MS has a value of 1. The line designated by MRT multiplexing represents transmission capacity for an MS combination that is optimal in consideration of all possible MS combinations, and each of the lines designated by MS1 and MS2 represents transmission capacity for each MS. The line designated by Single Antenna Transmission (SAT) represents transmission capacity for a scheme in which signals are transmitted using a single antenna, as in the existing cellular system. For a fair comparison with the MRT scheme using two antennas for signal transmission, in terms of the amount of resources used, doubled transmission capacity is represented for the SAT scheme.

As seen from the results in FIG. 4, the MRT multiplexing scheme exhibits transmission improved capacity as compared to the SAT scheme used in the existing cellular system and the MRT scheme collaboratively using two antennas for signal transmission.

II. Orthogonal Vector Generation Method

In performing the multiplexing scheme, a method of generating orthogonal beamforming vectors and transmitting signals by using the generated beamforming vectors is another way to minimize a transmission capacity loss due to inter-signal interference. It is assumed that $B=\{b_1, b_2, \ldots, b_M\}$ is a set of indexes of MSs receiving signals, and $W=\{w_1, w_2, \ldots, w_M\}$ is a set of beamforming vectors of transmission symbols. More specifically, B and W are determined through the following three steps:

Step 1. A BS first selects an MS that is best in terms of a sum of channel power from among N MSs located in a cell. The beamforming vector for the selected MS can be obtained from Equation (8), where i indicates the index of the selected MS is initialized by 1.

$$b_i = \underset{n \in \{1,2,\ldots,N\}}{\operatorname{argmax}} \{\|h_n\|^2\} \quad (8)$$

$$w_i = h_{b_i}^H.$$

In Equation (8), superscript H denotes the Hermitian (Complex Conjugate and Transpose) operator, and subscript n denotes indexes of N MSs existing in the cell.

Step 2. i is increased by 1, and then an orthogonal beamforming vector can be obtained using Equation (9), and through the Gram-Schmidt process (total of (N-i+1) orthogonal beamforming vectors can be obtained).

$$g_n = h_n - \sum_{j=1}^{i-1} \frac{<h_n, w_j>}{\|w_j\|^2} w_j, \quad \begin{matrix} n \in \{1, 2, \ldots, N\} \\ n \neq b_1, b_2, \ldots, b_{i-1} \end{matrix} \quad (9)$$

In Equation (9), j is defined as an index needed in the orthogonal vector generation method.

Step 3. $b_i$ and $w_i$ are selected using the beamforming vector obtained by Equation (9) and using Equation (10).

$$b_i = \underset{\substack{n \in \{1,2,\ldots,N\} \\ n \neq b_1, b_2, \ldots, b_{i-1}}}{\operatorname{argmax}} \{\|g_n\|^2\} \quad (10)$$

$$w_i = g_{b_i}^H.$$

After the three steps are performed, the second and third steps are repeatedly performed until i indicating the index of the selected MS is increased to the number of selected MSs.

Figure 5:
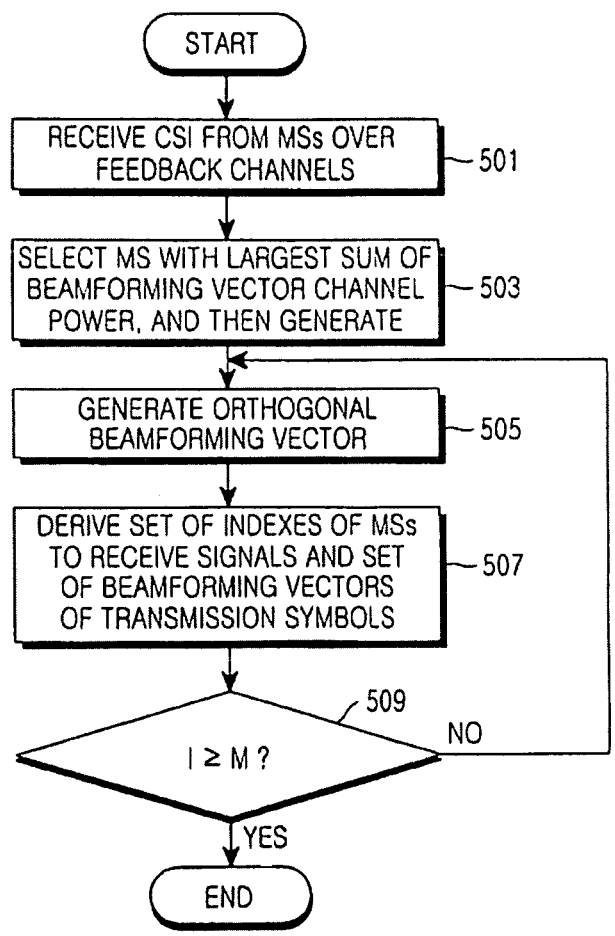
FIG. 5 is a flowchart illustrating a procedure of generating orthogonal beamforming vectors and selecting optimal MSs in accordance with an embodiment of the present invention.

FIG. 5 illustrates a procedure of generating orthogonal beamforming vectors and selecting optimal MSs according to an embodiment of the present invention. More specifically, in FIG. 5, the orthogonal vector generation method above is illustrated.

Referring to FIG. 5, in step 501, a BS receives CSI including a column vector of beamforming matrix H from each MS over a feedback channel. In step 503, the BS selects an MS that is best in terms of a sum of channel power, and obtains the beamforming vector of the selected MS. Here, i that is an index indicating the number of selected MSs is initialized by 1. In step 505, the BS increases i by 1, and generates a beamforming vector orthogonal to the beamforming vector obtained in step 503. In step 507, and the BS derives a set of indexes for MSs, which are to receive signals, and a set of beamforming vectors of transmission symbols by using the orthogonal beamforming vector. In step 509, the BS repeatedly performs steps 505 and 507 until i that is an index indicating the number of selected MSs equals M.

Figure 6:
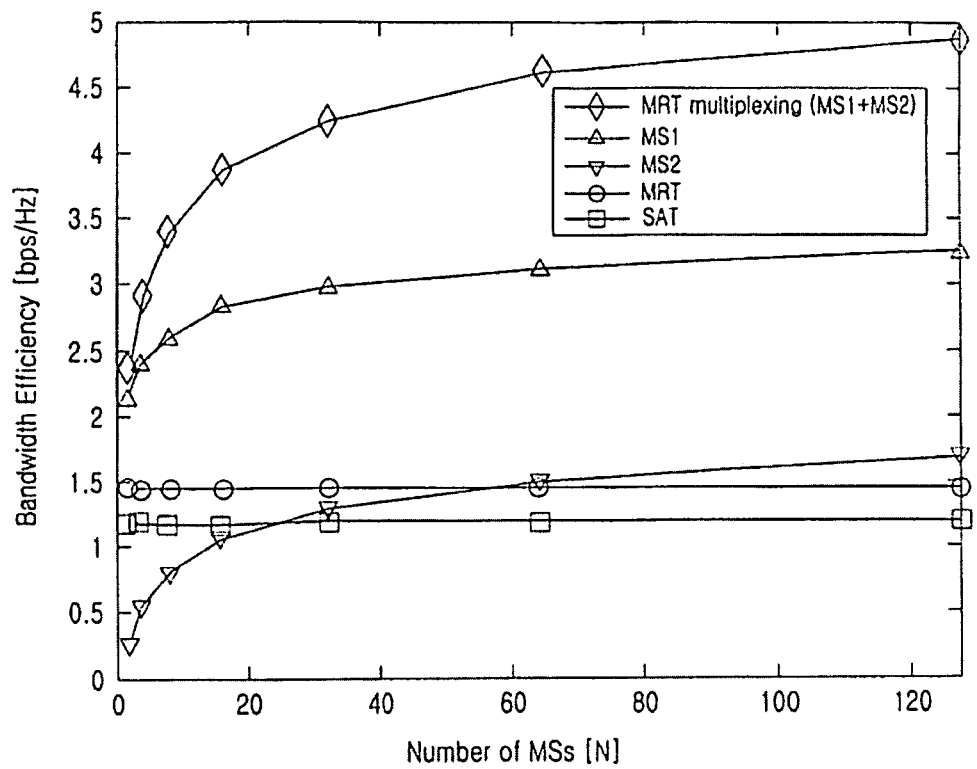
FIG. 6 is a graph illustrating bandwidth efficiency analysis results according to a number of MSs through an orthogonal vector generation method in accordance with an embodiment of the present invention.

FIG. 6 illustrates bandwidth efficiency analysis results according to the number of MSs through the orthogonal vector generation method according to an embodiment of the present invention. More specifically, in FIG. 6, the X-axis represents the total number of MSs located within the system, and the Y-axis represents transmission capacity for an MS combination maximizing capacity.

Referring to FIG. 6, variations of channel capacity according to an increase in the total number of MSs existing in a cell, N, are plotted under the Rayleigh fading channel environment where two RSs select two MSs, and a channel response between each RS and each MS gas a value of 1. Similar to FIG. 4, FIG. 6 shows that the MRT multiplexing scheme exhibits improved transmission capacity as compared to the SAT scheme used in the existing cellular system and the MRT scheme collaboratively using two antennas for signal transmission.

By comparison of FIG. 4 and FIG. 6, while MS1 and MS2 exhibit similar transmission capacity in the case of FIG. 4, MS1 with the best channel state exhibits transmission capacity having a significant difference from that of MS 2 in FIG. 6. Accordingly, the method represented in FIG. 4 is advantageous in that it finds an optimal combination by calculating the number of cases of all possible MS combinations, but is disadvantageous in that the number of calculations increases. Alternatively, the method represented in FIG. 6 is advantageous in that it finds an MS combination using relatively fewer calculations because MSs to be combined are found by obtaining a beamforming vector for an MS that is best in terms of a sum of channel power and beamforming vectors orthogonal thereto, but is disadvantageous in that it cannot always find an optimal combination. Consequently, FIG. 6 exhibits better performance than FIG. 4 because an MS with extraordinarily good performance improves the overall performance, and such a result may vary according to the number of users to which to transmit signals and according to channel environments.

Figure 7:
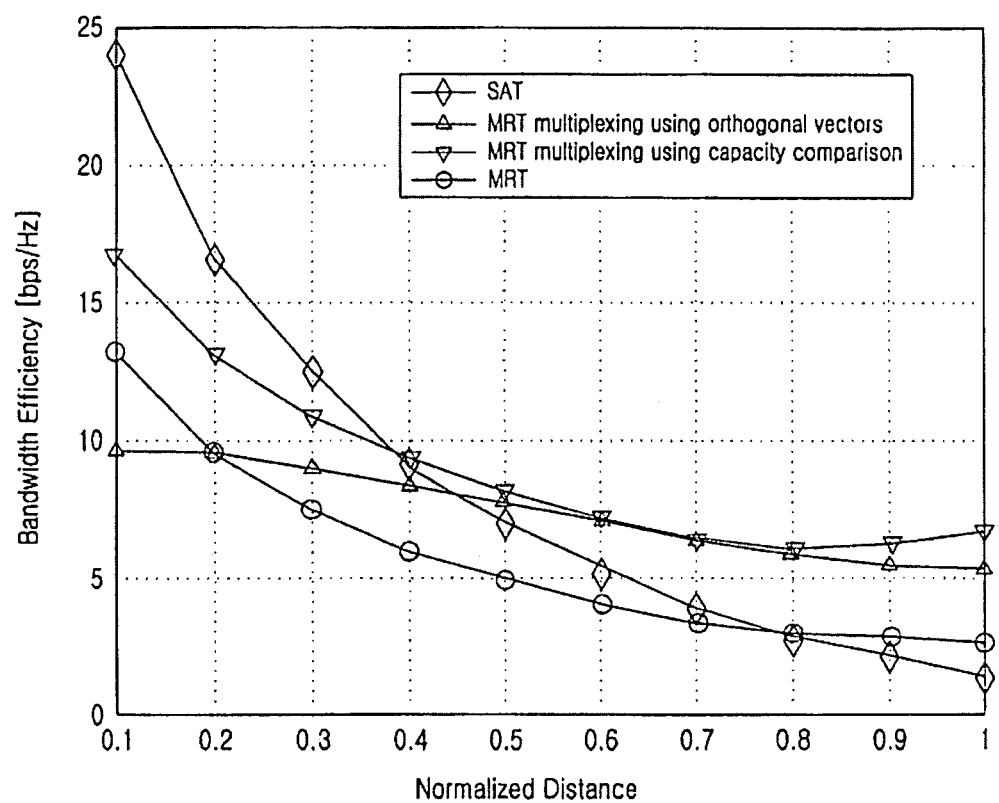
FIG. 7 is a graph illustrating bandwidth efficiency analysis results according to distances in a cellular system using wired RSs in accordance with an embodiment of the present invention.

FIG. 7 illustrates bandwidth efficiency analysis results according to distances in a cellular system using wired RSs in accordance with an embodiment of the present invention. More specifically, the results in FIG. 7 are obtained by a series of tests in which 100 MSs are generated at positions (0.1, 0.2, ..., 1) marked on the X-axis, while the MSs move from RS1 (normalized distance=0) to the mid-point (normalized distance=1) between RS1 and RS2.

Referring to FIG. 7, the line designated by SAT corresponds to a signal being transmitted to one MS without collaborative transmission in the existing cellular system, and the line designated by MRT corresponds to collaborative transmission between two RSs. As seen from the results in FIG. 7, due to multi-user diversity gain and gain obtained by multiplexing transmission, use of the MRT multiplexing scheme yields performance gain in comparison to the SAT scheme in a normalized distance range of above 0.4 or 0.5, and also yields performance gain in comparison to the MRT scheme in most positions.

According to the various embodiments of the present invention as described above, when signals are transmitted in a distributed antenna system, channel information for each MS is detected, MSs minimizing interference therebetween are selected from among multiple MSs located within a cell, and then the signals are transmitted to the selected MSs, such that performance gain can be obtained by multiplexing, and transmission capacity can be increased using collaborative transmission between RSs.

While the present invention has been shown and described with reference to certain embodiments thereof, it will be understood by those skilled in the art that various changes in form and details may be made therein without departing from the spirit and scope of the present invention as defined by the appended claims and equivalents thereof.

What is claimed is:

1. A method of processing signals in a distributed antenna system, the method comprising:
    receiving, by a Base Station (BS), Channel State Information (CSI) from Mobile Stations (MSs) located within a coverage area of the BS or a coverage area of Relay Stations (RSs) connected to the BS;
    multiplying signals for transmission to the MSs by beamforming vectors by using the received CSI; and
    transmitting, by the BS and the RSs, the multiplied signals for transmission to the MSs,
    wherein the beamforming vectors include weight values of signals to be transmitted to the MSs by the RSs, and the received CSI includes channel response values between the BS or the RSs and the MSs.

2. The method of claim 1, further comprising:
    repeatedly transmitting the CSI to the BS over feedback channels; and
    updating, by the BS, the received CSI.

3. The method of claim 1, wherein multiplying the signals by the beamforming vectors comprises:
    determining all possible MS combinations including MSs to which signals can be simultaneously transmitted from among the MSs located within the coverage areas of the BS and the RSs;
    detecting an MS combination that maximizes overall transmission capacity from the determined MS combinations;
    generating beamforming vectors by using CSI of MSs included in the MS combination that maximizes the overall transmission capacity;
    multiplying signals that are to be transmitted to the MSs included in the MS combination that maximizes the overall transmission capacity, by the beamforming vectors; and
    transmitting the multiplied signals multiplied to the MSs.

4. The method of claim 3, wherein the overall transmission capacity is obtained using:

$$C = \sum_{m=1}^{M} \log(1 + \Gamma_m),$$

where, M denotes a number of the MSs included in the MS combination, and Γm denotes Signal-to-Interference plus Noise Ratios (SINRs) of the MSs.

5. The method of claim 3, wherein the MS combination that maximizes the overall transmission capacity is obtained using:

$$A_{max} = \operatorname*{argmax}_{A_q} \left\{ \sum_{m \in A_q} \log_2(1 + \Gamma_m) \right\},$$

where, Amax denotes the MS combination that maximizes the overall transmission capacity M denotes a number of the MSs included in the MS combination, and Γm denotes Signal-to-Interference plus Noise Ratios (SINRs) of the MSs.

6. The method of claim 1, wherein multiplying the signals by the beamforming vectors comprises:
    selecting an MS with a largest sum of channel power;
    generating a beamforming vector for the MS with the largest sum of channel power by using CSI thereof;
    generating a beamforming vector orthogonal to the generated beamforming vector for the MS with the largest sum of channel power;
    detecting an MS for simultaneous signal transmission using the orthogonal beamforming vector;
    multiplying a signal to be transmitted to the MS with the largest sum of channel power by the beamforming vector;
    multiplying a signal to be transmitted to the MS for simultaneous signal transmission by the orthogonal beamforming vector; and
    transmitting the multiplied signals to the MSs.

7. The method of claim 6, wherein the beamforming vector for the MS with the largest sum of channel power is obtained using:

$$b_i = \operatorname*{argmax}_{n \in \{1,2,\ldots,N\}} \{\|h_n\|^2\}$$

$$w_i = h_{b_i}^H,$$

where, superscript H denotes a Hermitian (Complex Conjugate and Transpose) operator, and subscript n denotes indexes of N MSs located within a cell.

8. The method of claim 6, wherein the orthogonal beamforming vector is obtained through a Gram-Schmidt process represented by:

$$g_n = h_n - \sum_{j=1}^{i-1} \frac{<h_n, w_j>}{\|w_j\|^2} w_j, \quad \begin{array}{l} n \in \{1, 2, \ldots, N\} \\ n \neq b_1, b_2, \ldots, b_{i-1} \end{array},$$

where i is an index of a selected MS, j is an index needed in an orthogonal vector generation method, and n is the number of selected MSs.

9. The method of claim 6, wherein at least one orthogonal beamforming vector is generated based on a number of the MSs distributed in corresponding coverage.

10. An apparatus for processing signals in a distributed antenna system, the apparatus comprising:
   Mobile Stations (MSs);
   a Base Station (BS) for multiplying signals for transmission to the MSs located within a cell coverage area by independent beamforming vectors, and transmitting the multiplied signals;
   relay stations (RSs) for relaying at least one of the multiplied signals transmitted from the BS,
   wherein the MSs receive the multiplied signals from the BS or the RSs,
   wherein the BS receives Channel State Information (CSI) for the MSs located within the cell coverage area, and transmits the signals to the respective MSs, based on the received CSI, and
   wherein the beamforming vectors include weight values of signals to be transmitted to the MSs by the RSs, and the received CSI includes channel response values between the BS or the RSs and the MSs.

11. The apparatus of claim 10, wherein the BS and at least one of the RSs collaboratively transmit the multiplied signals to at least two of the MSs.

12. The apparatus of claim 11, wherein at least two of the RSs collaboratively transmit the multiplied signals to at least two of the MSs.

* * * * *